Jan. 21, 1969

B. A. LOOMANS 3,423,074

MULTIPURPOSE CONTINUOUS MIXING AND/OR KNEADING APPARATUS

Filed Jan. 12, 1967

INVENTOR.
BERNARD A. LOOMANS
BY Leaman, Leaman & McCulloch

INVENTOR.
BERNARD A. LOOMANS
BY Learman, Learman & McCulloch

United States Patent Office 3,423,074
Patented Jan. 21, 1969

3,423,074
MULTIPURPOSE CONTINUOUS MIXING AND/OR
KNEADING APPARATUS
Bernard A. Loomans, Saginaw, Mich., assignor to Baker
Perkins Inc., Saginaw, Mich., a corporation of New
York
Filed Jan. 12, 1967, Ser. No. 608,770
U.S. Cl. 259—6                                  8 Claims
Int. Cl. B01f 7/04, 7/08; B29f 3/02

ABSTRACT OF THE DISCLOSURE

This invention relates to mixing and/or kneading machines of a type wherein two or more shafts are journaled in a mixer housing and pairs of radially engaging paddle-shaped sections are provided on the shafts, between a charge opening and a discharge opening, which are driven at the same speed and in the same direction of rotation to homogeneously mix and/or knead a variety of materials, which may be in plastic, liquid, granular or powder form, and are moved continuously in the mixer from the charge opening to the discharge opening.

Background of the invention

A continuous mixer of the aforementioned character forms the subject matter of the present assignee's United States Patent No. 3,195,868, granted July 20, 1965. As the aforementioned patent well illustrates, mixing elements in such a mixer may consist of a plurality of progressively angularly displaced paddles, either straight or formed on a helix, provided in axially abutting relation on the mixing shafts and shaped to continuously wipe the walls of the enclosing housing and also their own radial surfaces so that the surfaces of the mixer are continually wiped clean during the operation thereof. While mixers of this type are well suited to what may be termed the power kneading of plastic substances and subject the materials being mixed to an intense shearing and kneading action, I have discovered that better results can be achieved with some materials if what may be termed transition surfaces are employed between the paddle sections.

Summary of the invention

Briefly, the invention in one aspect thereof is concerned with the provision of self-cleaning transition surfaces connecting angularly offset, radially engaging mating paddle sections which are provided on two or more mixer shafts.

Other objects and advantages of the invention will be pointed out specifically or will become apparent from the following description when it is considered in conjunction with the appended claims and the accompanying drawings.

Description of the preferred embodiments

Figure 1:
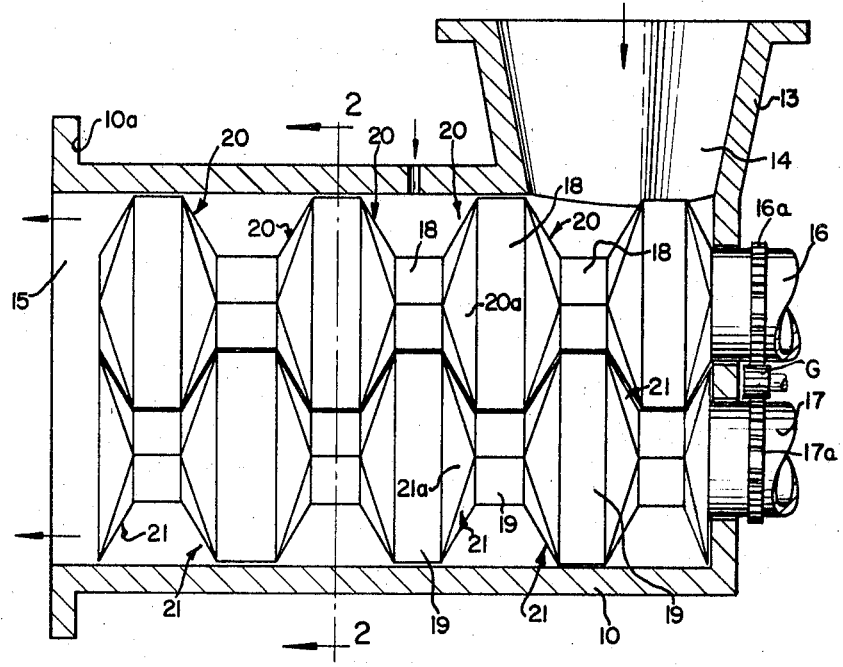
FIGURE 1 is a schematic, sectional side elevational view of a mixing or kneading machine formed in accordance with the invention.
Figure 2:
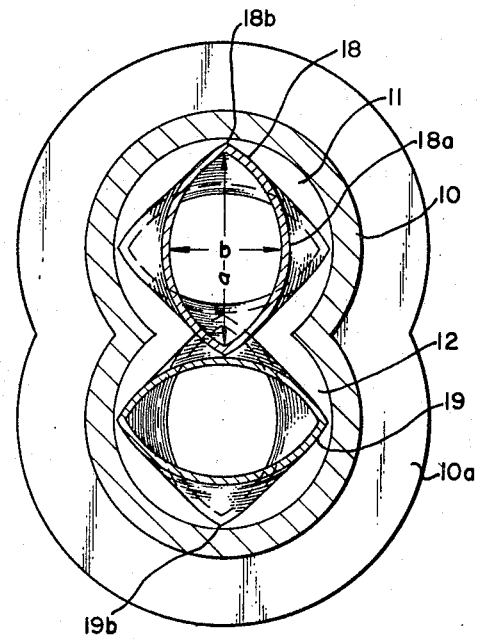
FIGURE 2 is a transverse sectional view taken on the line 2—2 of FIGURE 1.

Referring now more particularly to the accompanying drawings and, in the first instance, to FIGURES 1 and 2, a mixer housing, generally designated 10 and in the shape of a figure eight, is shown in FIGURE 2 as forming an upper mixing chamber 11 and a lower communicating mixing chamber 12. The mixer housing or casing includes a hopper 13 leading to a material charging opening 14 at one end and the opposite end of casing 10 is open, as at 15, to provide a discharge opening. Commercial machines of this type are disclosed in the aforementioned United States patent, wherein a jacketed casing is shown in detail, and it is to be understood that the form of casing illustrated in this application is intended as a schematic representation only, inasmuch as the invention is concerned with the mixing shafts 16 and 17 which are provided to rotate in the chambers 11 and 12, respectively, rather than with the casing. At the discharge end of the casing a flange 10a is provided in FIGURES 1 and 2 to permit the attachment of a discharge housing such as shown in the aforementioned patent, if desired. The shafts 16 and 17 are schematically shown as driven at the same speed and in the same direction of rotation by gears 16a and 17a which may be driven by a gear G connected with a suitable electric motor (not shown) in the usual manner.

Provided on the shafts 16 and 17 are mating pairs of radially interengaging, lenticular mixing and kneading paddle sections 18 and 19, respectively, which are displaced 90° one to the other. Each of the paddle sections 18 and 19 has a major axis $a$ and a minor axis $b$ and each of the sections 18 and each of the sections 19 is respectively angularly displaced 90° from the axially adjacent section 18 or 19 as the case may be. The paddle sections 18 are separated by what may be termed symmetrical transition portions, generally designated 20, and the adjacent paddle sections 19 are similarly separated by identical symmetrical mating transition portions 21. Each transition section 20 and 21 is made up of four symmetric, laterally curvilinear surfaces 20a and 21a, respectively, extending from a flank 18a or 19a, respectively, of a paddle section 18 or 19 to the extremities 18b and 19b, respectively, of the major axis of an adjoining paddle section. As indicated in FIGURE 1, the transition sections 20 and 21 are in mating or matched relationship and the curvilinear surfaces 20a and 21a thereof are mating or matching and self-cleaning in the sense that they continually wipe one another.

Figure 3:
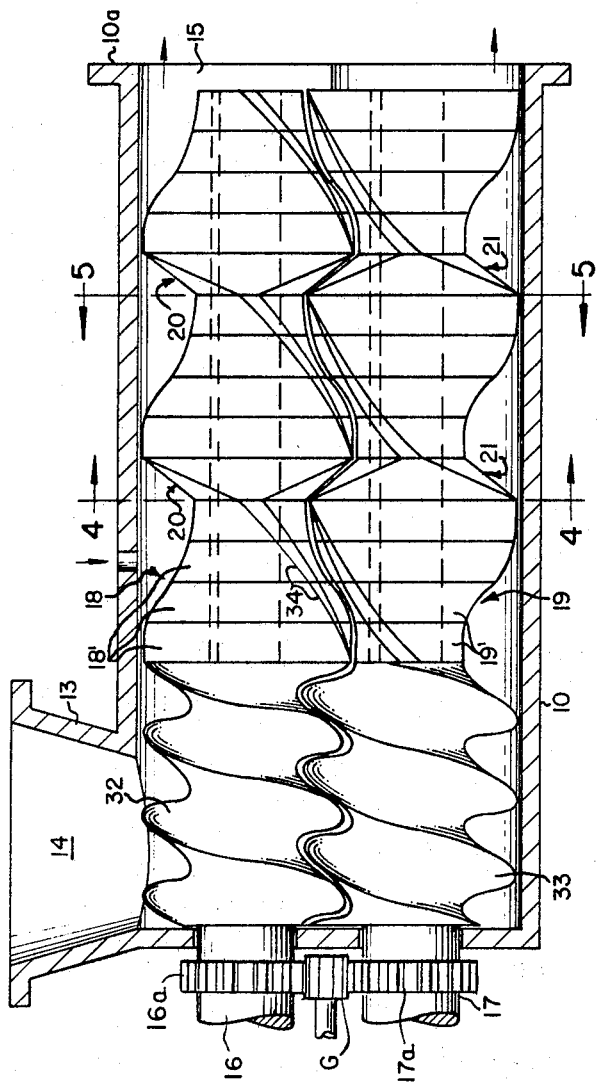
FIGURE 3 is a schematic, sectional side elevational view illustrating another embodiment of the invention.
Figure 4:
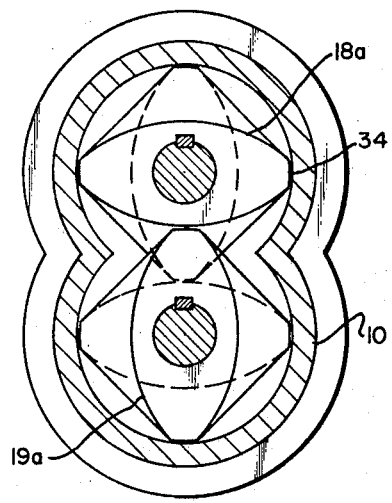
FIGURE 4 is a transverse sectional view taken on the line 4—4 of FIGURE 3.
Figure 5:
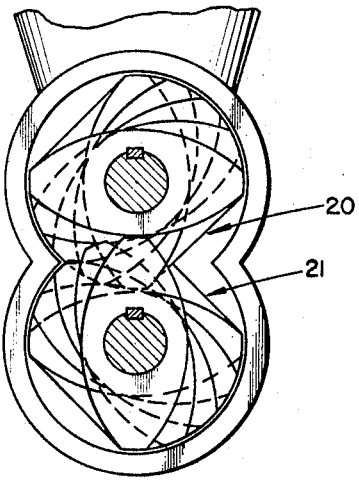
FIGURE 5 is a transverse sectional view taken on the line 5—5 of FIGURE 3.

In FIGURE 3 a modified embodiment of the invention is disclosed in which the same numerals have been used to identify similar parts where possible. In this embodiment of the invention shafts 16 and 17 may be solid, nontubular members to which elements, such as the mating advancing screw portions 32 and 33, respectively, may be keyed. Further, the mating transition elements 20 and 21 are separately cast or otherwise formed and may be keyed to shafts 16 and 17, respectively. In this embodiment of the invention the paddle sections 18 and 19 are comprised of a series of four lenticular paddles 18' and 19', respectively, which are progressively angularly offset to form a helix. As FIGURES 7 and 8 indicate, the flank portions 18a and 19a of the paddles 18' and 19' do not extend to a point and, rather, arcuate crest portions 34 are provided. The paddles 18' and 19' are themselves formed with a helical pitch, as FIGURES 3 and 5 clearly indicate. It has been determined that mixer elements formed in this manner do an excellent job of mixing many materials and tend to retain the material in the mixer for a sufficient length of time to accomplish an intimate blending of the mixed ingredients. While I have shown the various lenticular paddles 18' as individual, it should be understood that the sections 18 and 19 could easily be cast in one piece and keyed to the shafts 16 and 17, respectively, or that the shafts 16 and 17 could be cast with integral portions 32–33 and 18–19.

Figure 6:
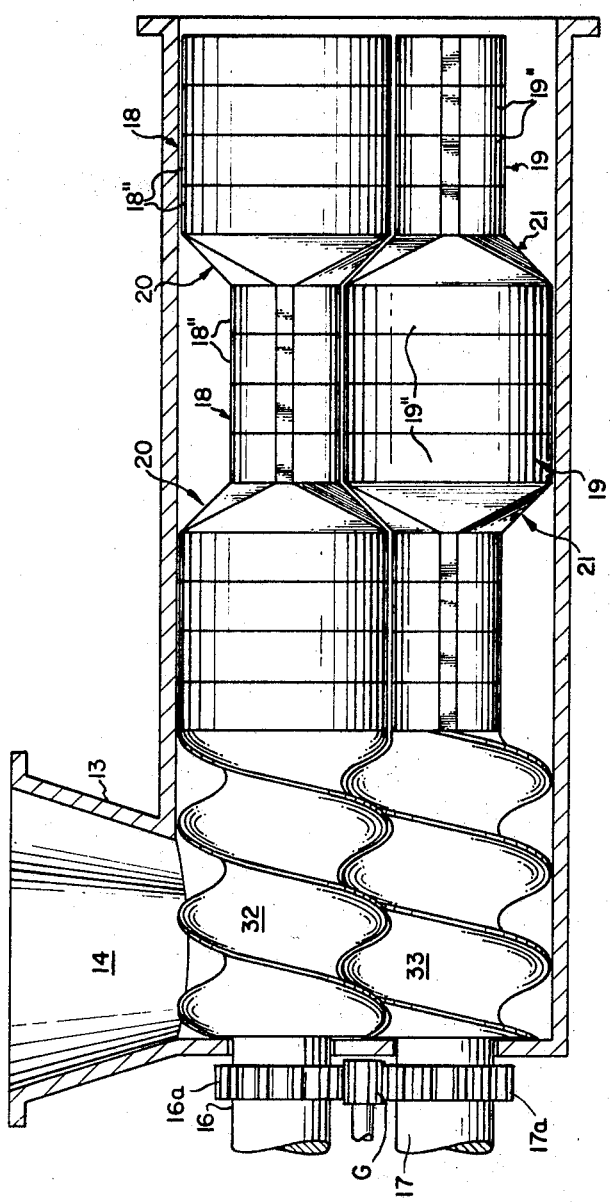
FIGURE 6 is a schematic sectional, side elevational view similar to FIGURE 3 and illustrating a still further embodiment of the invention.

In FIGURE 6 I have shown another embodiment of the invention wherein again I have used identical numerals, where possible, to identify parts previously described. This embodiment of the invention is very similar to the embodiment shown in FIGURE 3 except that the paddles 18″ and 19″ forming paddle sections 18 and 19 are not pitched or helical and their crests 34 do not form a helix as do the crests of the paddles 18′ and 19′ in FIGURE 3. While again the paddle sections 18 and 19 are shown as made up of four paddles each, it is to be understood that more or fewer paddles could be used, if desired, and that each paddle section 18 and 19 shown could be cast in one piece.

In operation, the material to be mixed or kneaded in each instance is fed into the charge opening 14, is mixed and/or kneaded in the chamber 10, and is discharged out opening 15. Various materials can be better mixed with certain of the mixers shown than with others. As with previous mixers of this general design, the paddle sections are self-cleaning in the sense that they continually wipe one another, and they also continually wipe the interior walls of the housing 10, so that accumulations of material do not collect on the housing or on the paddle sections. The transition sections 20 and 21 also continuously wipe one another and cause the material to move forwardly and reversely in a zigzag path which enhances the blending operation. While not shown in FIGURE 1, advancing screw sections could be provided on the right ends of shafts 16 and 17 to maintain a more constant forwarding of the material in this embodiment of the mixer.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit the invention or the scope of the appended claims.

I claim:

1. In kneading and like machines: barrel means having inlet and outlet means; at least a pair of substantially axially parallel shafts extending in said barrel means; means for revolving said shaft at the same speed and in the same direction of rotation; radially extending pairs of axially spaced apart paddle sections on said pair of shafts shaped to wipe one another substantially continuously during said rotation; axially spaced pairs of said paddle sections being angularly offset from one another with respect to the axis of rotation of said shafts; and pairs of symmetric transition sections on said pair of shafts shaped to substantially wipe one another substantially continuously during said rotation and to provide kneading surfaces connecting angularly offset paddle sections.

2. The combination defined in claim 1 in which said paddle sections comprise single, generally lenticular paddles with each paddle of a pair extending with its major axis at right angles to the other and each paddle section displaced substantially 90° from the adjacently spaced paddle section on the same shaft.

3. The combination defined in claim 2 in which said transition surfaces connecting adjoining paddle sections comprise four adjoining, radially inclined, laterally curvilinear surfaces of generally triangular shape connecting each set of axially adjoining paddle sections.

4. The combination defined in claim 1 in which said paddle sections comprise a series of generally lenticular paddles arranged in helically progressing, abutting relation to form helical paddle sections.

5. The combination defined in claim 4 in which said abutting paddle sections have crests at the ends of their major axes which extend helically so that the crests of the abutting paddles together form a continuous helical crest surface of substantially constant width for each paddle section.

6. The combination defined in claim 1 in which said transition surfaces comprise radially inclined, laterally curvilinear surfaces leading from the radial extremity of one paddle section on a shaft to a flank of an adjoining paddle section.

7. The combination defined in claim 1 in which each paddle section comprises a plurality of axially abutting, substantially lenticular axially aligned paddles and each paddle section of a pair of paddle sections extends with its major axis at right angles to the other, each paddle section also being angularly displaced 90° from the axially adjacent paddle section on the same shaft.

8. The combination defined in claim 1 wherein the barrel means comprise at least a pair of connecting cylinders of such dimension that the paddle sections wipe the walls thereof.

References Cited

UNITED STATES PATENTS 3,195,868  7/1965  Loomans et al. _____ 259—104
3,203,370  8/1965  Haug et al. _____ 259—6 XR
3,343,922  9/1967  Zimmer et al. _____ 259—6 XR WALTER A. SCHEEL, *Primary Examiner.*

JOHN M. BELL, *Assistant Examiner.*

U.S. Cl. X.R.

18—12; 165—87; 259—104